United States Patent
Nies et al.

(10) Patent No.: US 8,277,184 B2
(45) Date of Patent: Oct. 2, 2012

(54) TILT ADJUSTMENT SYSTEM

(75) Inventors: Jacob Johannes Nies, Zwolle (NL); Shanmuga-Priyan Subramanian, Rheine (DE)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 12/765,001

(22) Filed: Apr. 22, 2010

(65) Prior Publication Data

US 2011/0262272 A1    Oct. 27, 2011

(51) Int. Cl.
*F03D 7/00* (2006.01)
(52) U.S. Cl. .................. 416/9; 416/41; 416/148
(58) Field of Classification Search ............. 416/9, 41, 416/142, 147, 148, 205, 246
See application file for complete search history.

(56) References Cited

U.S. PATENT DOCUMENTS

| | | | | |
|---|---|---|---|---|
| 4,045,147 | A | * | 8/1977 | Curp .......................... 416/100 |
| 5,354,175 | A | * | 10/1994 | Coleman et al. ................ 416/9 |
| 6,327,957 | B1 | * | 12/2001 | Carter, Sr. ....................... 91/41 |
| 7,075,192 | B2 | * | 7/2006 | Bywaters et al. ............... 290/55 |
| 2004/0120801 | A1 | * | 6/2004 | Antoune et al. ............... 415/4.2 |
| 2006/0159550 | A1 | * | 7/2006 | Nagao ....................... 416/132 B |
| 2007/0267872 | A1 | | 11/2007 | Menke | |

FOREIGN PATENT DOCUMENTS

| | | |
|---|---|---|
| DE | 10140793.9 A1 | 3/2003 |
| DE | 102004027992 A1 | 1/2006 |
| EP | 1647708 A1 | 4/2006 |
| EP | 1683965 A2 | 7/2006 |
| WO | 2008003389 A1 | 1/2008 |
| WO | 2008064678 A2 | 6/2008 |

\* cited by examiner

*Primary Examiner* — Edward Look
*Assistant Examiner* — Andrew C Knopp
(74) *Attorney, Agent, or Firm* — Global Patent Operation; Douglas D. Zhang (57) ABSTRACT

A wind energy system is provided with said wind energy system including a hub pivotable about a rotation axis, a first bearing connected to said hub, a tapered adapter, a second bearing connected to said first bearing by said adapter, wherein said first and second bearings and said adapter are arranged such that the tilt angle of said rotation axis of said hub is adjustable. Further, a tilt adjustment system for a wind energy system and a method for operating a wind energy system is provided.

20 Claims, 5 Drawing Sheets

TILT ADJUSTMENT SYSTEM

BACKGROUND OF THE INVENTION

The present disclosure relates to a wind energy system and a method for operating a wind energy system. In particular, the present invention relates to a tilt adjustment system for a wind energy system.

Rotation axes of hubs of wind energy systems are often provided with a tilt angle with respect to a perpendicular to an axis through the tower to create a required static clearance between tips of the rotor blades mounted to the hub and the tower of the wind energy system. The static clearance depends inter alia on maximum expected wind conditions and on the material properties of the rotor blades. The clearance is required to avoid contact between rotor blades and the tower. However, this positive tilt angle of the rotation axis of the hub of the wind turbine results in a misalignment angle between the axis of rotation of the hub and the rotor blades and the direction of the wind. Accordingly, the wind encounters the rotor blades under a misalignment angle.

Additionally, the inflow direction of the wind to the rotor is generally misaligned with the horizontal, a natural phenomenon known as upflow. In contrast to the tilt angle, the upflow angle, or the angle between the upflow and the horizontal, is generally variable, depending on wind and site conditions. Hence, a misalignment angle is the sum of the tilt angle and the upflow angle.

The misalignment angle results in a reduction of the area covered by the rotor blades perpendicular to the wind direction. Therefore, energy yields can be reduced compared to the situation of perfectly perpendicular inflow to the rotor plane. Furthermore, inflow misalignment can contribute to unsteady loading, which makes operation of the wind energy system more complicated. Thus, a wind energy system is desired which reduces the misalignment angle, especially in wind conditions where the maximum power of the turbine has not been reached.

BRIEF DESCRIPTION OF THE INVENTION

In view of the above, a wind energy system is provided, including a hub pivotable about a rotation axis; a first bearing connected to the hub; a tapered adapter; and, a second bearing connected to the first bearing by the adapter; wherein the first and second bearings and the adapter are arranged such that the tilt angle of the rotation axis of the hub is adjustable.

According to another aspect, a wind energy system is disclosed including a nacelle; an upper yaw bearing connected to said nacelle; a tapered adapter connected to the upper yaw bearing; and, a lower bearing supporting the adapter.

According to a further aspect, a tilt adjustment system for a wind energy system is provided including a first bearing; a tapered adapter; and, a second bearing connected to the first bearing by the adapter; wherein the first and second bearings and the adapter are arranged for adjusting a tilt angle of a shaft of a wind energy system.

According to a further aspect, a method is provided for operating a wind energy system including a hub pivotable about a rotation axis, a first bearing connected to the hub, a second bearing, and a tapered adapter connecting the first bearing and the second bearing; the method includes determining a set tilt angle for the rotation axis; and, rotating at least one of the first bearing and the second bearing, such that a tilt angle of the hub is adjusted to the set tilt angle.

According to a further aspect, a method is provided for operating a wind energy system including a hub pivotable about a rotation axis and connected to a nacelle; wherein the method includes determining a set tilt angle for the rotation axis; and, rotating an upper yaw bearing depending on the set tilt angle, the upper yaw bearing supporting the nacelle and being mounted on top of a tapered adapter.

Further aspects, advantages, details, and features that can be combined with embodiments described herein are apparent from the dependent claims, the description, and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Within the following description of the drawings, the same reference numbers refer to the same components. Generally, only the differences with respect to the individual embodiments are described. The structures shown in the drawings are not depicted true to scale but rather serve only to enable better understanding of the embodiments.

Figure 1:
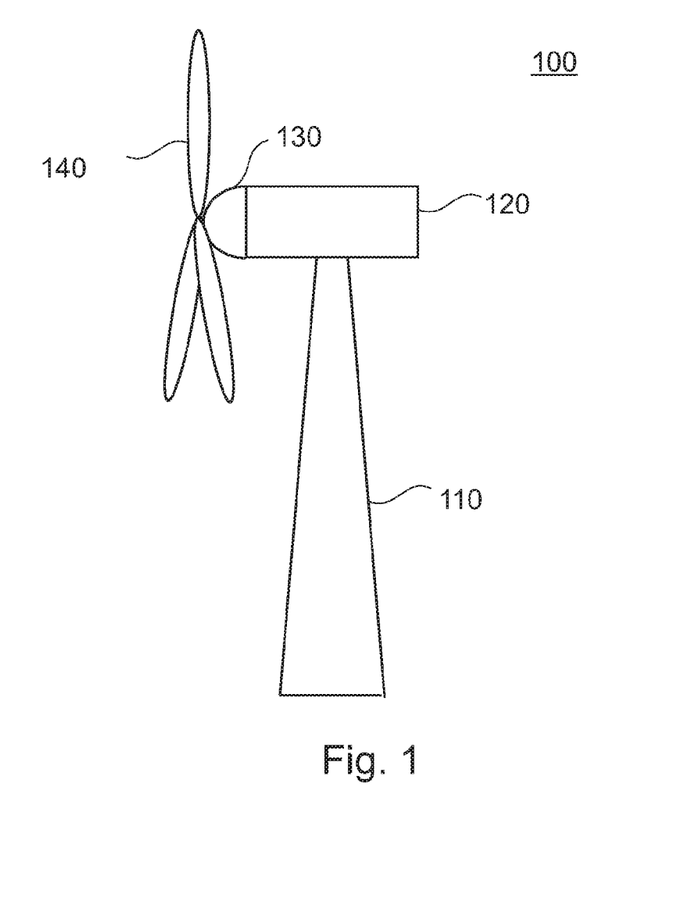
FIG. 1 is a schematic view of a wind energy system according to embodiments described herein.

FIG. 1 is a schematic view of a wind energy system 100, also referred to as a wind turbine. The wind energy system 100 includes a tower 110 to which a machine nacelle 120 is mounted at its top end. A hub 130 having three rotor blades 140 is mounted thereto.

The hub 130 is mounted to a lateral end of the machine nacelle 120. The hub may generally be connected to a generator (not shown) located inside the machine nacelle 120 of the wind energy system 100. The hub is typically rotatable about a substantially horizontal axis. Not shown in FIG. 1 are two bearings and a tapered adapter being arranged to provide a tilt adjustment system for adjusting the tilt angle of the rotation axis of the hub.

A "tilt angle" as used herein should be understood as being the angle between the rotor plane, in which the rotor blades are positioned, and the vertical direction. The rotor plane may be understood as being an idealized two-dimensional representation of the actual three-dimensional arrangement of the rotor blades. In particular, the rotor blades are not necessarily arranged within a single plane, but may define a conical volume. In this case, the rotor plane is located within the axial extension of the cone.

Typically, a plane or line herein denoted with the term "horizontal" should be understood as being a plane or line which is at least locally perpendicular to a line extending through the geocenter. For instance, a horizontal plane is perpendicular to the direction of the gravity force. The vertical direction is substantially rectangular to the horizontal direction.

A tilt adjustment system in accordance with embodiments described herein will be described with reference to FIG. 2.

Figure 2:
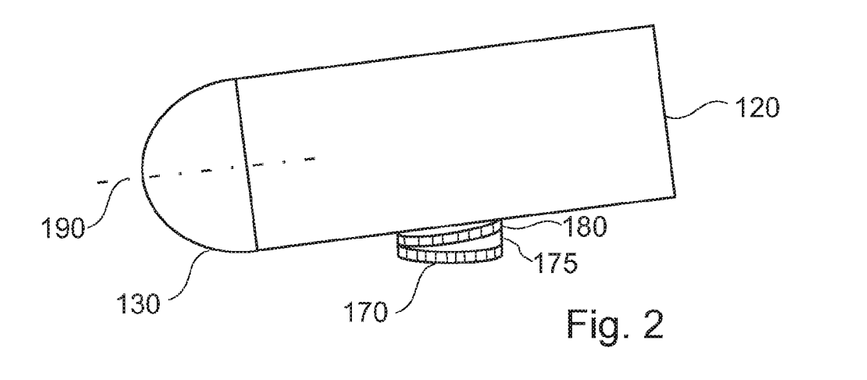
FIG. 2 is a schematic drawing of a tilt adjustment system according to embodiments described herein.

FIG. 2 is a schematic view of a tilt adjustment system for a wind energy system according to embodiments described herein. The tilt adjustment system shown in FIG. 2 includes a first bearing 170, also referred to as a lower yaw bearing 170. Furthermore, the tilt adjustment system includes an adapter 175 being arranged on top of the lower yaw bearing 170. On top of the adapter, a second bearing 180 is arranged. The second bearing 180 could also be referred to as an upper yaw bearing 180. The adapter 175 is tapered such that it has two inclined surfaces, one surface being connected with the first bearing 170 and the second surface being connected to the second bearing 180.

Adding a second yaw bearing at a slightly inclined angle to the first and lower yaw bearing enables the tilt angle to be adjusted during changing wind conditions. According to embodiments described herein, an adapter being situated between two bearings is provided, the adapter being tapered, such that the two bearings are arranged at a slightly inclined angle. Herein, the term "slightly inclined" or the term "tapered" include angles between the two surfaces of the adapter between 0.1° and 15.0°. According to other embodiments, the maximum angle is 5.0° or 10.0°. According to embodiments, the maximum angle is between 3.0° and 8.0°. According to further embodiments described herein, the two bearings are arranged between the nacelle and the shaft of the wind energy system. The term "connected", as used herein, refers to a direct connection of parts or any indirect link (e.g., additional adapters or other parts, such as washers or the like). A direct connection may include screws, bolts, or welded joints.

Typical embodiments described herein include at least two bearings and at least one tapered adapter between the bearings. Embodiments including two tapered adapters connected by one bearing provide the possibility of adjusting the tilt angle while keeping the roll angle of the nacelle constant. The roll angle of the nacelle will be understood as the angle about the horizontal plane. Typical embodiments described herein include adapters being integrated into the bearing or bearings mounted in an inclined position. Integrated bearings with adapters are also encompassed in references to a bearing or an adapter.

In typical embodiments, configurations having three yaw bearings and two tapered adapters being alternately positioned are used to adjust the yaw angle, the roll angle, and the tilt angle of the nacelle. It will be understood that the adapters are mounted between two bearings, wherein the middle bearing is mounted between two adapters. These embodiments, which are described with respect to FIG. 12 in more detail below, allow the angle to be varied in the horizontal direction as well. More particularly, they allow the inclination angle to be varied between 0° up to an angle that is the sum of the tapering angles of the two tapered adapters.

The nacelle 120 is connected to the second bearing 180. The hub 130 mounted to the nacelle 120 is rotatable about a rotation axis 190. The tilt angle of the rotation axis 190 can be adjusted. In fact, the tilt angle of the rotation axis 190 depends on the angular position of the first bearing 170 and the second bearing 180 (i.e., the relative position of the adapter 175 to the nacelle 120).

In embodiments described herein, a first or lower bearing is mounted on a tower of the wind energy system. A tapered adapter is arranged on top of the first bearing, and a second bearing or an upper yaw bearing is arranged on top of the tapered adapter. The nacelle is mounted to the second bearing. The tilt angle of the rotation axis of the hub mounted to the nacelle can be adjusted by turning the second bearing. However, it should be noted that when turning the second bearing, both the tilt angle and the yaw angle are altered. Therefore, the first bearing is provided to adjust the yaw angle. By turning the first bearing and the second bearing in opposite directions, where only the adapter is turned, the yaw angle can be kept constant while altering only the tilt angle.

Embodiments described herein typically yield a higher level of energy exploitation at relatively low cost impact. To be precise, the energy yield can rise up to a few percent. Especially in upflow conditions, embodiments described herein show a higher wind energy yield. At least one of the first bearing and the second bearing of typical embodiments described herein is arranged as a sliding bearing. A sliding bearing provides a threshold to reduce forces on the bearing and other parts. In the event that the torque in the bearing exceeds the threshold, the bearing begins to slide and therefore reduces said forces. The yaw bearings can be a roller bearing, a sliding bearing, or a combination of both. Typical embodiments use a direct drive generator or a gearbox-setup.

The term "upflow" as described herein typically means a flow which is directed upwards relative to the horizontal plane.

In typical embodiments, the maximum tilt angle is chosen with respect to the air speed. At low air speeds (e.g., at an air speed of about 0.1-10.0 m/s), a higher negative maximum tilt angle is allowed, wherein at higher air speeds (e.g., at an air speed of 20.0-25.0 m/s, up to about 30.0 m/s), the maximum tilt angle is reduced to provide a greater clearance between the rotor blade and the tower. In the range between low and high air speeds (e.g., in the range between 10.0 m/s and 20.0 m/s), a transitional strategy may be performed. In an example of a transitional strategy, the tilt angle may not only depend on actual values of the air speed but on the history of the air speed. Thus, a hysteresis-type control is implemented in the transitional regime. The term negative tilt angle refers to a tilt angle where the hub points downwards. In general, the term "maximum tilt angle" refers to an operational state showing a minimum required static clearance between the rotor blades and the tower. This minimum required static clearance depends on wind conditions due to dynamic wind loads. According to further embodiments described herein, the maximum tilt angle is set to a certain value, for example, a maximum of 3° to 12°, typically of 4° to 10°, and more typically of 5° to 8° with respect to the horizontal angle.

Figure 3:
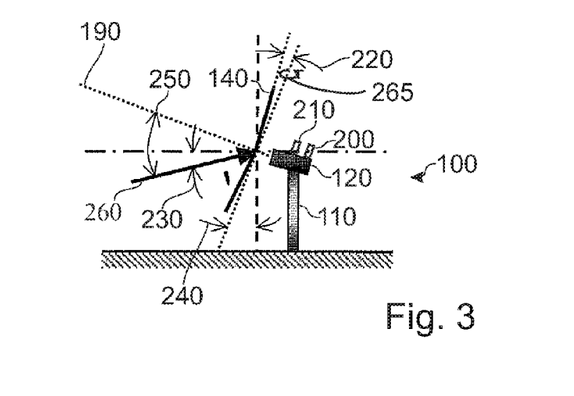
FIG. 3 is a schematic drawing illustrating the geometry of wind energy systems according to embodiments described herein.

FIG. 3 shows a wind energy system according to embodiments described herein. FIG. 3 is a simplified drawing of the geometry of a wind energy system 100. Furthermore, an air speed indicator 200 and a wind direction indicator 210 are also shown in FIG. 3. In typical embodiments, these parts are used to feed air speed values or wind direction values to a controller controlling the bearings and adjusting the tilt angle and other angles, such as the yaw angle.

Typical embodiments include an air speed indicator and a wind direction indicator directly mounted to the nacelle. Further embodiments include additional external air speed indicators or wind direction indicators. These external indicators can be arranged at remote sites (e.g., 50 meters or more away from the tower of the wind energy system). Further embodiments include indicators mounted to the tower of the wind energy system. Typical embodiments include indicators to determine air speed and wind direction. The upflow can be measured with a wind direction indicator or can be calculated from typical conditions at the site where the wind energy system is located. A further technique used in typical embodiments is to analyze the loads on the blades as they rotate in order to detect the upflow. Typical embodiments use this data to determine an optimum tilt angle and an optimum yaw angle to improve the yield of the wind energy system. The wind direction measurement can be used to detect the most appropriate tilt angle.

In FIG. 3, several angles of typical embodiments described herein are shown. The rotor blades 140 are tilted from the rotation plane around the center of the hub. The cone angle 220 is typically between 0.1° and 13°, more typically between 0.5° and 12.0°, and even more typically between 1.5° and 7.0°. Furthermore, the upflow angle 230 is shown in FIG. 3. Moreover, the tilt angle 240 is depicted in FIG. 3, wherein the sum of the upflow angle 230 and the tilt angle 240 equals the misalignment angle 250. It should be noted that the wind direction is depicted in FIG. 3 by an arrow 260.

Figure 4:
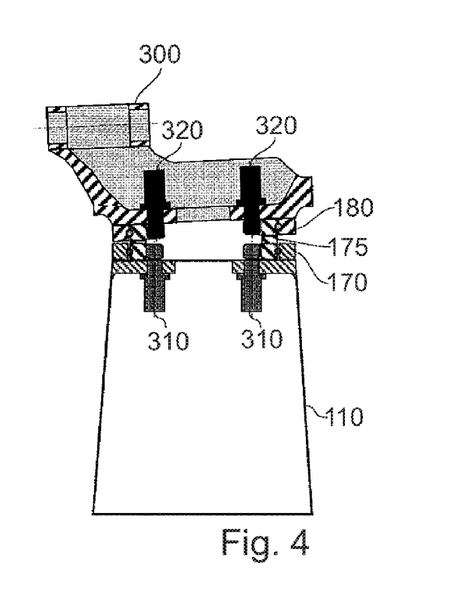
FIG. 4 is a schematic drawing of a tilt adjustment system according to embodiments described herein.
Figure 5:
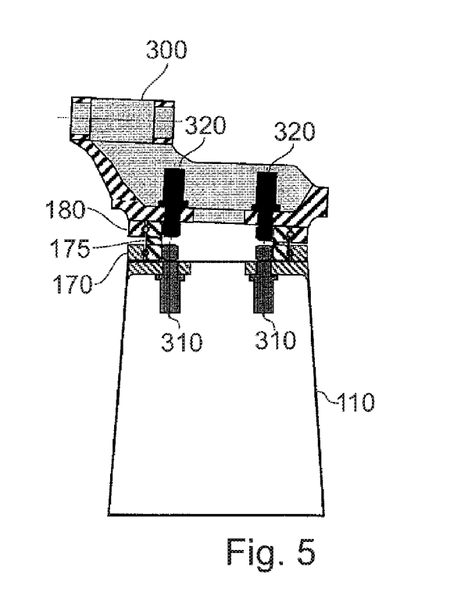
FIG. 5 is a schematic drawing of the tilt adjustment system according to FIG. 4 shown in different position as compared to FIG. 4.

Two different angular positions of the yaw bearings 170 and 180 of the embodiment shown in FIG. 1 are illustrated in FIGS. 4 and 5. In FIGS. 4 and 5, the nacelle and a shaft to which the hub of the wind energy system is mounted have been omitted from FIGS. 4 and 5, which can be seen as sectional views of the wind energy system shown in FIG. 1 and the tilt adjustment system shown in FIG. 2.

It will be seen in FIGS. 4 and 5 that a bed plate 300 is arranged on top of the second or upper yaw bearing 180. Further, two bearing drives 310 for the lower first bearing 170 and two upper bearing drives 320 for the upper second bearing 180 are shown. The bearing drives 310, 320 are used to adjust the angular positions of the bearings 170 and 180. By adjusting the positions of the bearings 170 and 180, the yaw angle 265 and the tilt angle 240 of the tilt adjustment system can be altered.

Typical embodiments use two bearing drives per bearing. Other typical embodiments described herein use four or only one bearing drive per bearing. More bearing drives can provide a more powerful positioning of the bearings. Fewer bearing drives or only one bearing drive provide less energy consumption. Embodiments described herein typically use a bed plate. Further wind energy systems according to embodiments described herein use a space frame or other frames as the main frame.

FIGS. 6 to 9 show gooseneck-type wind energy systems 100 according to embodiments described herein. The gooseneck-type wind energy systems 100 include a gooseneck 400 to which a first bearing 170 is mounted.

Figures 6, 7:
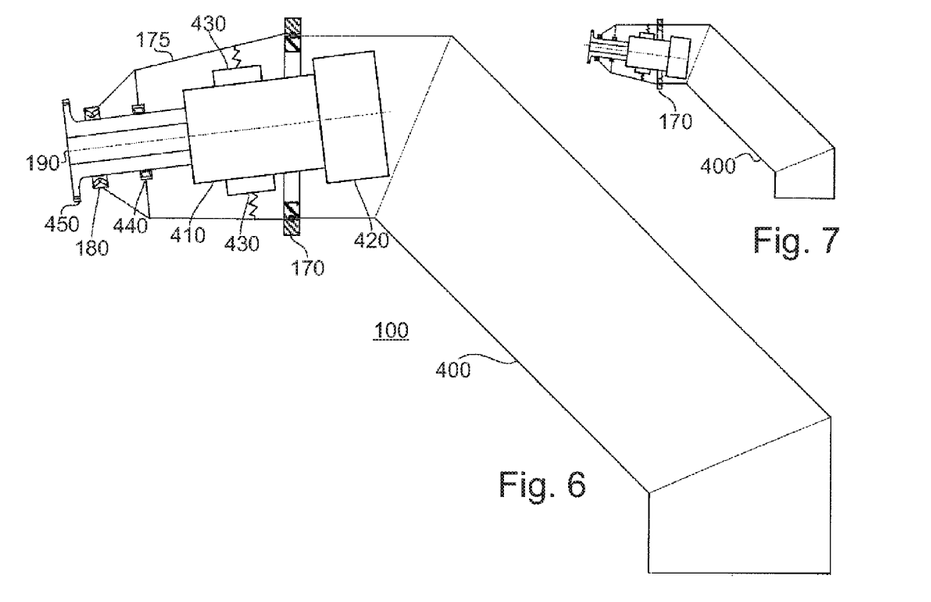
FIG. 6 is a schematic drawing of a tilt adjustment system according to embodiments described herein.
FIG. 7 is a schematic drawing of the tilt adjustment system according to FIG. 6 shown in different position as compared to FIG. 6.

In the embodiment shown in FIGS. 6 and 7, an adapter 175 is mounted to the first bearing 170. The adapter 175 supports a gearbox 410 to which a generator 420 is mounted. The gearbox 410 is attached to the wall of the adapter 175 by flexible mounts 430. Furthermore, a second bearing 180 is mounted to the adapter 175. Moreover, an additional bearing 440 is mounted to the adapter 175, wherein the second bearing 180 and the additional bearing 440 support a shaft 450. The hub 130 is mounted to the shaft 450 (not shown in FIGS. 6 and 7). Again, the shaft 450 and the hub are rotatable about a rotation axis 190. The adapter 175 is tapered, such that the axes of rotation of the bearings 170 and 180 are inclined.

In typical embodiments described herein, a first bearing is mounted to a gooseneck-type nacelle, wherein a tapered adapter is mounted to the first bearing. On the inner side of the walls of the adapter, the gearbox is mounted by simple flexible mounts. The gearbox is mounted by struts in other embodiments described herein. It will be noted that the struts or the flexible mounts are subjected to torque forces of the shaft. By rotating the first bearing, the tilt angle of the shaft can be adjusted without influencing the load on the flexible mounts. The second bearing is used as a main bearing for the shaft. Typical gooseneck-type embodiments include a yaw bearing below the gooseneck to alter the yaw angle. The yaw bearing of gooseneck-type embodiments is additional to the first and the second bearing.

According to further embodiments described herein, the gearbox is mounted to the gooseneck, wherein a flexible joint is connected to the shaft. A gearbox input shaft is connected to the flexible joint. Hence, the torque is transferred from the shaft to the flexible joint and from there to the gearbox input shaft to be transmitted to the gearbox. By mounting the gearbox to the gooseneck, the gearbox is not turned in case the first bearing is rotated. Therefore, this embodiment provides easier handling of the oil return line since the position of the oil return line remains the same. Furthermore, the torque can be transmitted directly to the gooseneck and does not have to be transmitted over the first bearing.

In FIG. 7, another position of the wind energy system of FIG. 6 is shown, wherein the first bearing 170 is turned about 180° such that the rotation axis 190 now has a tilt angle which is different in comparison to its initial tilt angle. Additionally, intermediate positions of the first bearing 170 can be used for adjustment of the tilt angle. Turning of the first bearing 170 could be used to adjust the tilt angle to actual wind inflow angles, which are not stable over time.

Figures 8, 9:
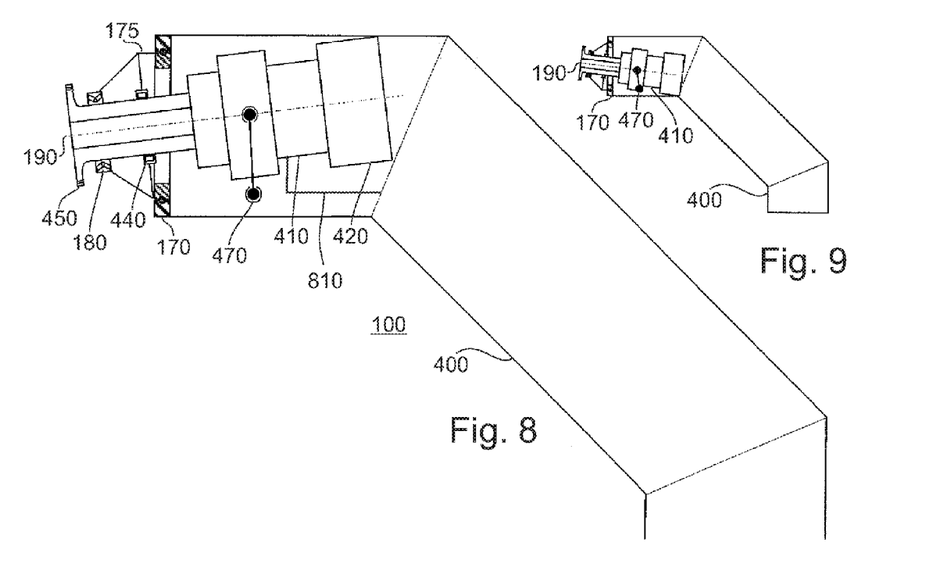
FIG. 8 is a schematic drawing of a tilt adjustment system according to embodiments described herein.
FIG. 9 is a schematic drawing of the tilt adjustment system according to FIG. 8 shown in another position as compared to FIG. 8.

Another arrangement, according to embodiments described herein, is shown in FIGS. 8 and 9. The gearbox is typically mounted to the gooseneck via adjustable supports; the adjustable supports are hydraulic cylinders 470 in FIG. 8. When turning the first bearing 170 of the embodiment shown in FIG. 8, the gearbox 410 changes its vertical position. Since the gearbox 410 has to keep its angular position relative to the rotation axis of the hub, however, the hydraulic cylinders 470 are needed to keep this angular position. When turning the first bearing 170, the hydraulic cylinders 470 have to be actuated to adjust the position of the gearbox 410.

In the embodiment shown in FIG. 8, the oil return line 810 remains underneath the gearbox 410. Furthermore, only the bearing friction torque has to be transmitted by the first bearing 170. It should be noted that torque transmitted by the first bearing 170 acts on the bearing drive (not shown in FIGS. 6 to 9). Therefore, low transmitted torque in relation to the chosen bearing is desired. Again, FIGS. 8 and 9 show different positions of the first bearing 170 resulting in different tilt angles of the rotation axis 190 and in different positions of the gearbox 410.

According to a typical embodiment described herein, hydraulic cylinders are used as torque arms. According to further embodiments described herein, electric motors are used to alter the vertical position of the gearbox.

With respect to the embodiments shown in FIGS. 6 to 9, it should be noted that the mechanism for tilting the tilt axis could also be a flexible joint that allows some angular displacement about the tilt axis. Such flexible joints can be driven by hydraulics or by electricity. In typical embodiments, the torque arms are of a linkage type. Hydraulic cylinders perform well, have low energy consumption, and do not need much space.

Figure 10:
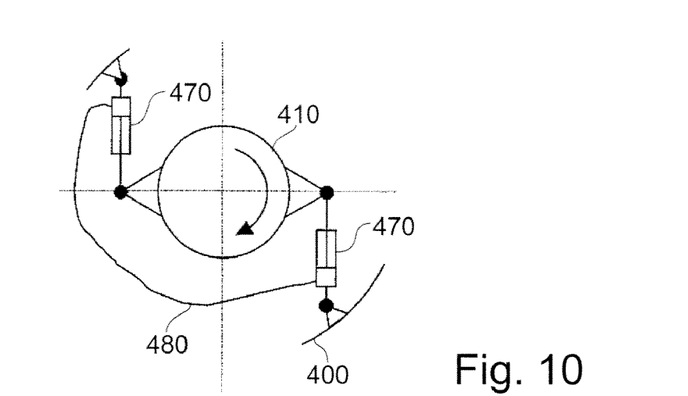
FIG. 10 is a schematic drawing of parts of a tilt adjustment system according to embodiments described herein.

In FIG. 10, the torque arms 470 of FIGS. 8 and 9 are shown in a schematic sectional view. Furthermore, the gearbox 410 is shown in a sectional view. The gearbox 410 is mounted to the two torque arms 470. The torque arms 470 are hydraulic cylinders, which are connected by a pressure equalizing line 480. The pressure equalizing line 480 allows limited rotation of the gearbox 410. This reduces forces to the walls of the gooseneck 400 to which the torque arms 470 are mounted.

According to typical embodiments described herein, the torque arms are hydraulic cylinders connected by a pressure equalizing line. This setup provides a reduction of maximum forces to the supporting walls. According to further embodiments described herein, springs are used as torque arms. Springs do not need maintenance and also reduce maximum forces. In further typical gooseneck-type embodiments, proper placement of the second bearing and the gearbox supports may make the need for adjustment of the length of the supports obsolete.

Below, typical methods according to embodiments described herein are disclosed. In general, the air speed indicator and the wind direction indicator are used to determine a set tilt angle and a set yaw angle. The turbine anemometry, or a combination of other sensors, may serve to determine the upflow angle under the actual conditions. The set tilt angle is calculated according to the measured air speed value by use of a controller. Thereby, typical site conditions can be considered to estimate an upflow angle of the wind. The site conditions can be stored in a table giving different upflow angles for different wind directions and different air speed values. Finally, a check is made to determine whether the calculated set tilt angle is smaller than a maximum tilt angle calculated depending on the air speed. At relatively high air speeds (e.g., at an air speed of 20.0-25.0 m/s, up to about 30.0 m/s), there can only be a small tilt angle or none at all due to safety restrictions. Contact of the rotor blades and the tower of the wind energy system must be avoided. Therefore, the maximum tilt angle depends on the air speed. Additionally, the measured wind direction value (measured by the wind direction indicator) is considered to determine a set yaw angle.

Figure 11:
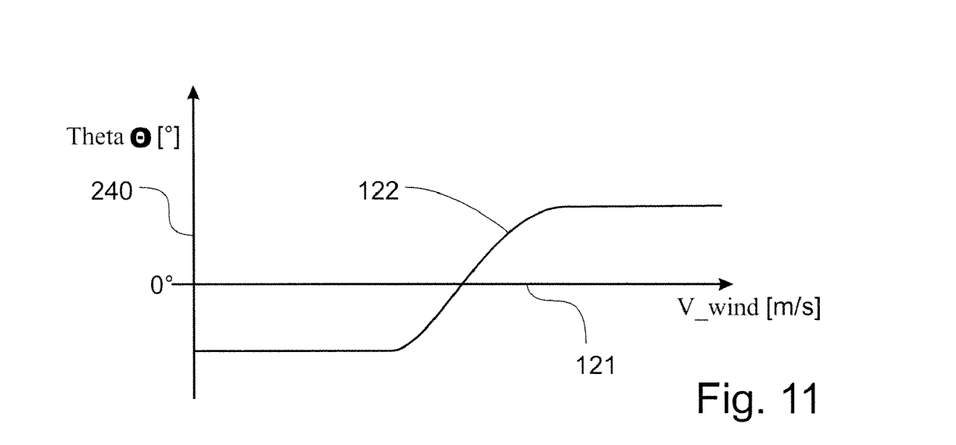
FIG. 11 is a schematic diagram illustrating a method according to embodiments described herein.

FIG. 11 shows which tilt angles Theta θ (reference number 240 in other figures described herein) are allowed depending on the wind speed V_wind 121. Allowed tilt angles are above the curved line 122 shown in FIG. 11. With increasing air speed, the tilt angle has to be increased and the rotation axis of the hub has to be directed upwards to prevent the rotor blades and the tower coming into contact. Herein, the expressions "increase", "higher", or other comparable expressions in conjunction with the tilt angle do not necessarily mean a numerical reduction or a numerical increase of the tilt angle. For example, an alteration of the tilt angle to positions with the hub pointing slightly upwards is also included in the expression "increasing the tilt angle." One aspect is the provision of sufficient clearance between the tower and the rotor blades.

After determining the set yaw angle and the set tilt angle, the controller actuates the first and the second bearing to position the nacelle in the optimal direction for the operation of the wind turbine. This is done by turning at least one of the first bearing and the second bearing, such that the tapered adapter is set in the correct angular position. Of course, additional embodiments according to FIGS. 6 to 9 can also be positioned using the controller. It will be understood, however, that with these embodiments, a tilt angle can be altered directly (without affecting of the yaw angle) by simply turning the first bearing.

Figure 12:
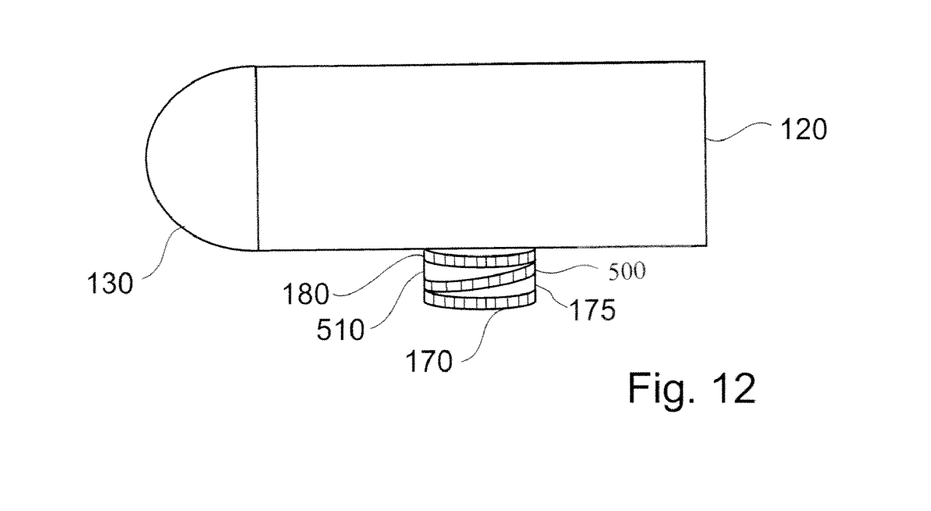
FIG. 12 is a schematic view of parts of a wind energy system according to embodiments described herein.

FIG. 12 is a schematic view of a tilt adjustment system of a wind energy system according to embodiments described herein. The tilt adjustment system shown in FIG. 12 includes a first bearing or lower yaw bearing 170. The tilt adjustment system further includes an adapter 175 being arranged on top of the lower yaw bearing 170. The adapter 175 is also referred to as a first tapered adapter 175. A middle yaw bearing 500 is arranged on top of the first tapered adapter 175 with a second tapered adapter 510 being arranged thereon. On top of the second tapered adapter 510, an upper yaw bearing 180 is arranged, such that a stack of bearings and tapered adapters with an alternating order is provided.

Wind energy systems according to embodiments described herein having three bearings and two adapters in a stacked order provide the possibility of adjusting the yaw angle, the roll angle, and the tilt angle of the nacelle independently of each other. Further typical embodiments include combinations of bearings being inclined to each other with tapered adapters between the bearings to make an adjustment of the tilt angle possible. The bearings and the adapters can be arranged between the nacelle and the tower or between the nacelle and the shaft. A combination of an inclined bearing under the nacelle and a further vertical bearing with an adapter supporting the shaft is also possible.

Figure 13:
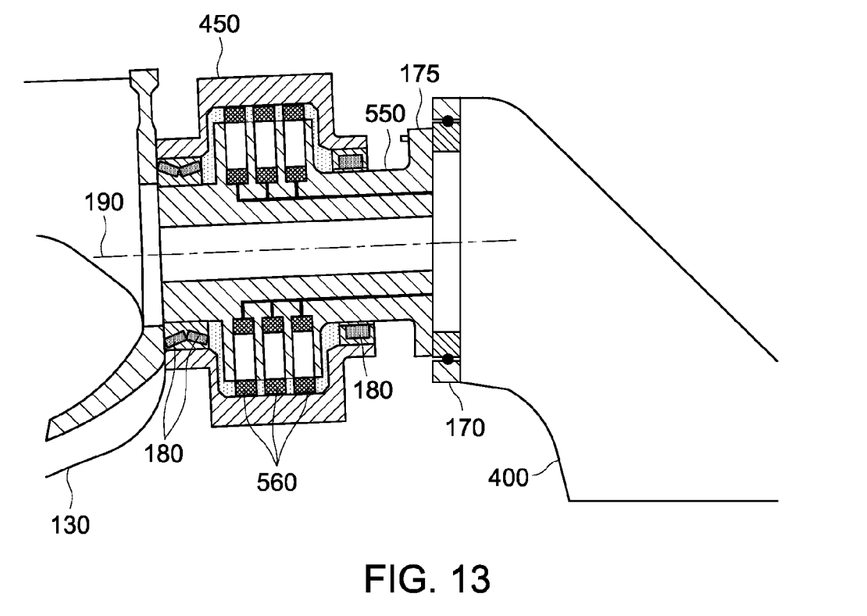
FIG. 13 is a schematic drawing of a further tilt adjustment system according to embodiments described herein; and, FIG. 14 is a schematic drawing of another tilt adjustment system according to embodiments described herein.
Figure 14:
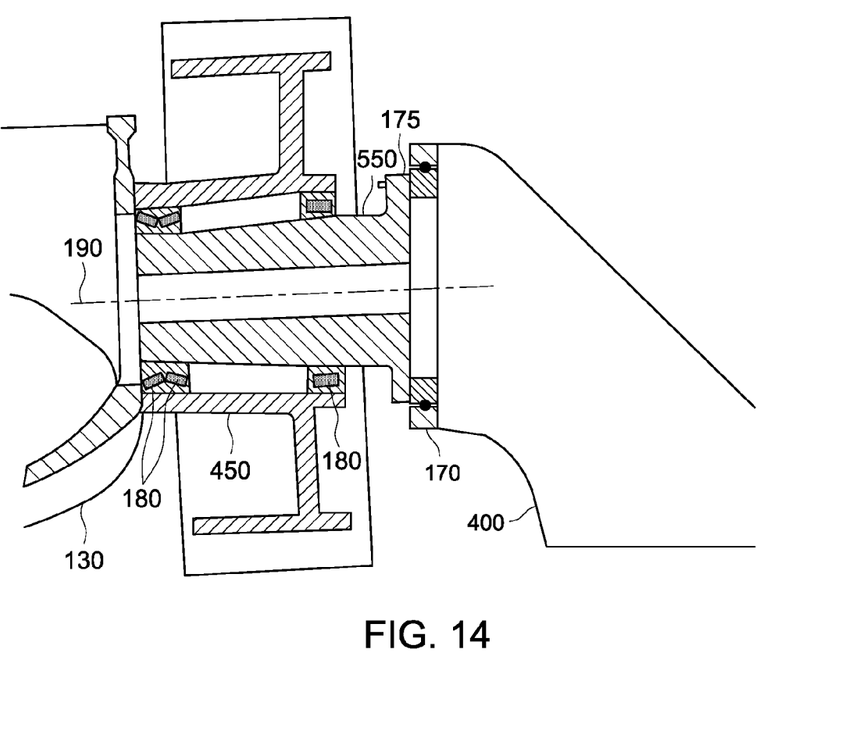

Two further arrangements according to embodiments described herein are shown in FIGS. 13 and 14. Both embodiments are part of a king-pin turbine, wherein the rotor and a portion of the drive train rotates about the king-pin. A king-pin is typically a movable connection of two parts. Typically, the king-pin is a pin on which a generator of a wind energy system may be mounted.

In FIG. 13, a tilt adjustment system according to embodiments described herein is shown. The shown embodiment uses a king-pin 550 on which a hollow shaft 450 is mounted by second bearings 180. In connection with FIGS. 13 and 14, the phrase "shaft" is used in the meaning of driveshaft, which may be hollow. The shaft 450 and a hub 130 rotate about a rotation axis 190, which is parallel to the longitudinal axis of the king-pin 550. Further, a tapered adapter 175 is formed integrally with the king-pin 550, wherein the tapered adapter 175, together with the integral formed king-pin 550, is rotatable about a horizontal axis. The tapered adapter 175 can also be referred to as an inclined adapter being integral with the king pin 550. An inclined axle is formed by the king-pin 550 together with the integral tapered adapter 175. In FIGS. 13 and 14, the inclined axle is shown as rotation axis 190. The axis of the axle is non-perpendicular to an active tilt bearing, namely a first bearing 170. The first bearing 170 is used to rotate the tapered adapter 175 and the integral formed king-pin about the horizontal axis. Due to the tapered form of the integral formed tapered adapter 175 and king-pin 550, the axis of rotation 190 of the hub 130 is tilted by rotation of the first bearing 170. Therefore, in the embodiment shown in FIG. 13, the first bearing can be construed as a tilt bearing. The second bearings 180 can be referred to as shaft bearings. It should be mentioned that the embodiment shown in FIG. 13 uses a hydrostatic drive with pumps 560 for power transmission from the shaft 450 to a remote generator.

In FIG. 14, another tilt adjustment system according to embodiments described herein is shown. The shown embodiment uses a king-pin 550 on which a hollow shaft 450 is mounted by second bearings 180. Therefore, the embodiment shown in FIG. 14 has similarities to the one shown in FIG. 13. However, the embodiment shown in FIG. 14 is adapted for use together with a direct drive generator. The rotor can be mounted to the shaft 450, wherein a stator would be situated concentrically to the shaft 450.

According to embodiments described herein, wind energy systems and tilt adjustment systems with a king-pin arrangement can be used to build compact wind energy systems. The hydrostatic drive or the direct drive also provides for a compact system. The gooseneck-type configuration can be used to enhance the clearance between the tower and the blades, thus providing more flexibility in choosing the tilt angle. The tilt angle can be altered with different embodiments described herein. Typical power transmissions use hydrostatic, hydrodynamic, gearbox, or direct drives, wherein other drive systems can also be combined with embodiments described herein.

This written description uses examples to disclose the invention, including the best mode, and also to enable any person skilled in the art to practice the invention, including making and using any devices or systems and performing any incorporated methods. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A wind energy system comprising:
   a rotatable hub defining a rotation axis;
   a first bearing supporting said hub;
   an adapter comprising two surfaces which are generally opposite to each other, the two surfaces being inclined relative to each other so that the adapter is tapered; and
   a second bearing;
   wherein the two surfaces of the adapter are connected to said first bearing and said second bearing respectively in order to render a tilt angle of said rotation axis to be adjustable.

2. The wind energy system according to claim 1, wherein said first bearing is a lower yaw bearing mounted on a tower of said wind energy system.

3. The wind energy system according to claim 2, wherein said adapter is arranged on top of said lower yaw bearing.

4. The wind energy system according to claim 3, wherein said second bearing is an upper yaw bearing arranged on top of said adapter.

5. The wind energy system according to claim 1, wherein said first bearing is rotatable about a substantially horizontal axis and wherein said adapter is mounted on said first bearing.

6. The wind energy system according to claim 5, further comprising a shaft connected to said hub, said shaft being rotatable about said rotation axis so that said shaft is supported by said second bearing.

7. The wind energy system according to claim 6, further comprising a gearbox connected to said shaft and being supported by said adapter.

8. The wind energy system according to claim 6, further comprising:
   a gooseneck, wherein said first bearing being mounted to said gooseneck; and
   a gearbox connected to said shaft at one end and to said gooseneck at a second end.

9. The wind energy system according to claim 8, wherein said gearbox is connected to said gooseneck by means of torque arms.

10. The wind energy system according to claim 9, wherein said torque arms are balancing cylinders.

11. The wind energy system according to claim 6, further comprising:
    a gearbox input shaft; and
    a flexible joint configured to transmit torque between said shaft and said gearbox input shaft.

12. The wind energy system according to claim 1, further comprising a bearing drive to actuate at least one of said first bearing and said second bearing.

13. The wind energy system according to claim 12, further comprising a controller connected to said bearing drive and being programmed to adjust said tilt angle by controlling said bearing drive.

14. The wind energy system according to claim 13, further comprising an air speed indicator connected to said controller, wherein an air speed value is transmitted from said air speed indicator to said controller and said controller is programmed to adjust the tilt angle depending on said air speed value.

15. A wind energy system comprising:
    a nacelle;
    an upper yaw bearing connected to said nacelle;
    a first adapter comprising two surfaces which are generally opposite to each other, the two surfaces being inclined relative to each other so that the first adapter is tapered, one of the two surfaces being connected to said upper yaw bearing; and
    a lower bearing connected to the other of the two surfaces of said first adapter to support the first adapter.

16. The wind energy system according to claim 15, further comprising:
    an air speed indicator;
    a wind direction indicator; and
    a controller connected to said air speed indicator and said wind direction indicator for receiving an air speed value and a wind direction value, said controller being arranged to actuate said lower yaw bearing and said upper yaw bearing to position said nacelle depending on said air speed value and said wind direction value.

17. The wind energy system according to claim 15, further comprising a middle yaw bearing and a second tapered adapter, said middle yaw bearing and said second tapered adapter being arranged between said first tapered adapter and said upper yaw bearing such that said bearings and said tapered adapters are arranged in an alternating order to support said nacelle.

18. A method for operating a wind energy system, the wind energy system comprising a rotatable hub defining a rotation axis, a first bearing supporting said hub, a second bearing, and a adapter comprising two surfaces which are generally opposite to each other and connected to the first bearing and the second bearing, respectively, the two surfaces being inclined relative to each other so that the adapter is tapered, said method comprising:

determining a set tilt angle for said rotation axis; and     rotating at least one of said first bearing and said second bearing in order to adjust a tilt angle of said hub to said set tilt angle.

19. The method of claim 18, further comprising:

determining a wind speed value; and calculating said set tilt angle for said rotation axis depending on said wind speed value.

20. The method of claim 18, further comprising:

determining a wind tilt angle value; and calculating said set tilt angle for said rotation axis depending on said wind tilt angle value.

\* \* \* \* \*